US012775711B2

(12) United States Patent
Di Cosmo et al.

(10) Patent No.: US 12,775,711 B2
(45) Date of Patent: Oct. 27, 2026

(54) METHOD FOR PERFORMING AN OPERATIVE SYSTEM UPDATE IN A SECURE ELEMENT AND CORRESPONDING SECURE ELEMENT AND APPARATUS

(71) Applicant: STMICROELECTRONICS S.r.l., Agrate Brianza (IT)

(72) Inventors: Luca Di Cosmo, Naples (IT); Amedeo Veneroso, Caserta (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 239 days.

(21) Appl. No.: 18/438,113

(22) Filed: Feb. 9, 2024

(65) Prior Publication Data

US 2024/0281536 A1 Aug. 22, 2024

(30) Foreign Application Priority Data

Feb. 16, 2023 (IT) ........................ 102023000002649

(51) Int. Cl.
*G06F 21/57* (2013.01)
*G06F 21/79* (2013.01)

(52) U.S. Cl.
CPC ............ *G06F 21/572* (2013.01); *G06F 21/79* (2013.01)

(58) Field of Classification Search
CPC ......... H04W 12/35; H04W 4/50; G06F 21/57; G06F 21/77; G06F 21/62; G06F 21/572; G06F 21/602; G06F 8/65; G06F 8/61
See application file for complete search history.

(56) References Cited

U.S. PATENT DOCUMENTS 9,430,223 B2 * 8/2016 Filali-Adib ........... G06F 9/4856
9,436,455 B2 * 9/2016 Ziat ....................... H04W 12/35
9,639,347 B2 * 5/2017 Nolterieke .............. G06F 8/658
2018/0089434 A1 * 3/2018 Sibert ................. H04L 63/0853
2025/0085956 A1 * 3/2025 Ruau ..................... G06F 21/572

FOREIGN PATENT DOCUMENTS

EP 3176695 A1 * 6/2017 ............... G06F 8/65
EP 4124979 A1 2/2023

OTHER PUBLICATIONS

"GlobalPlatform Technology Executable Load File Upgrade Card Speculation v2.3—Amendment H," Version 1.1, Public Release, Mar. 2018. (52 pages).

* cited by examiner

*Primary Examiner* — Daniel B Potratz
(74) *Attorney, Agent, or Firm* — Seed IP Law Group LLP

(57) ABSTRACT

A method includes preserving custom objects and system objects of an application during an operative system update operation in a secure element. The custom objects and system objects are saved. The application is uninstalled and a new instance of the application is created. The saved custom objects and the saved system objects are recovered, and the new instance of the application is updated with the recovered custom objects and system objects. Saving a system object includes acquiring information content of fields of the system object, encoding and storing the information content into a data serialization format in a reserved area of a non-volatile memory of the secure element. Recovering the saved system object includes reading and decoding the encoded information content from the reserved area of the non-volatile memory of the secure element. The system object is recovered using the obtained information content of the fields.

27 Claims, 9 Drawing Sheets

METHOD FOR PERFORMING AN OPERATIVE SYSTEM UPDATE IN A SECURE ELEMENT AND CORRESPONDING SECURE ELEMENT AND APPARATUS

BACKGROUND

Technical Field

The description relates to a method for performing an operative system update in a secure element.

One or more embodiments may be applied, e.g., to Universal Integrated Circuit Cards (UICC), in particular embedded UICC (eUICC) for use, e.g., in mobile communication equipment. One more embodiment may also be applied for instance to iUICC (integrated UICC). One or embodiments may be in particular be applied to secure elements designed according to Java Card scripting language and GlobalPlatform execution environment specifications.

Description of the Related Art

Secure elements are represented substantially by a tamper-resistant platform on a chip, typically a one chip secure microcontroller, capable of securely hosting applications and their data, in particular confidential and cryptographic data (for example cryptographic keys), in accordance with the rules and security requirements set by trusted authorities.

There are different form factors, e.g., hardware designs, of secure elements: by way of example, embedded and integrated secure elements, SIM/UICC (eUICC, iUICC), smart microSD as well as smart cards. Secure elements may exist in different form factors to address the requirements of different business implementations and market needs. Secure elements typically may be integrated into larger embedded products to securely store sensitive information of the product and/or private or secret data of the user that handled with a higher level of security by the MCU/storage memory of the main product or when it is desirable to protect the secrecy/privacy of the data of the end user from being compromised by anyone, including an OEM of the product.

BRIEF SUMMARY

In an embodiment, a method comprises: performing an operative system update operation storing new binary code in a secure element; and preserving custom objects and system objects of an application on the secure element during the operative system update operation. The preserving includes: saving the custom objects and system objects of the application on the secure element; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of a non-volatile memory of the secure element. Recovering the saved system object includes: reading the encoded information content from the reserved area of the non-volatile memory of the secure element; decoding the read encoded information content, obtaining the information content of the fields of the system object; recovering the system object using the obtained information content of the fields. In an embodiment, the application is an application of a first Java Card Package or executable load file.

In an embodiment, a secure element comprises a non-volatile memory and processing circuitry coupled to the non-volatile memory. The processing circuitry, in operation, performs an operative system update operation storing new binary code in the non-volatile memory, and preserves custom objects and system objects of an application of the secure element during the operative system update operation. The preserving includes: saving the custom objects and system objects of the application in the non-volatile memory; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of the non-volatile memory; and recovering the saved system object includes: reading the encoded information content from the reserved area of the non-volatile memory; decoding the read encoded information content, obtaining the information content of the fields of the system object; and recovering the system object using the obtained information content of the fields.

In an embodiment, a system comprises processing circuitry, and a secure circuit having a non-volatile memory. The secure circuit is coupled to processing circuitry, and the secure circuit, in operation, performs an operative system update operation storing new binary code in the non-volatile memory, and preserves custom objects and system objects of an application of the secure element during the operative system update operation. The preserving including: saving the custom objects and system objects of the application in the non-volatile memory; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of the non-volatile memory. Recovering the saved system object includes: reading the encoded information content from the reserved area of the non-volatile memory; decoding the read encoded information content, obtaining the information content of the fields of the system object; and recovering the system object using the obtained information content of the fields. In an embodiment, the application is an application of a first Java Card Package or executable load file.

In an embodiment, a non-transitory computer-readable medium's contents cause a secure element to perform a method, the method comprising: performing an operative system update operation storing new binary code in the secure element; and preserving custom objects and system objects of an application of the secure element during the operative system update operation, the preserving including: saving the custom objects and system objects of the application on the secure element; uninstalling the application; creating a new instance of the application; recovering the saved custom objects and the saved system objects; and updating the new instance of the application with the recovered custom objects and system objects, wherein saving a system object includes: acquiring information content of fields of the system object; encoding the information content into a data serialization format; and storing the encoded information content in a reserved area of a non-volatile memory of the secure element; and recovering the saved system object includes: reading the encoded information content from the reserved area of the non-volatile memory of the secure element; decoding the read encoded information content, obtaining the information content of the fields of the system object; and recovering the system object using the obtained information content of the fields.

BRIEF DESCRIPTION OF THE SEVERAL VIEWS IN THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

It is here specified that for generality's sake is made here reference to a method for performing an operative system update in a secure element, although the solution here described in most case refers to method for performing an operative system upgrade in a secure element, e.g., an update which in some way improves or raises the grade of the operative system (or of the applications/applets), e.g., improves the quality or the capabilities of the software.

Figure 1:
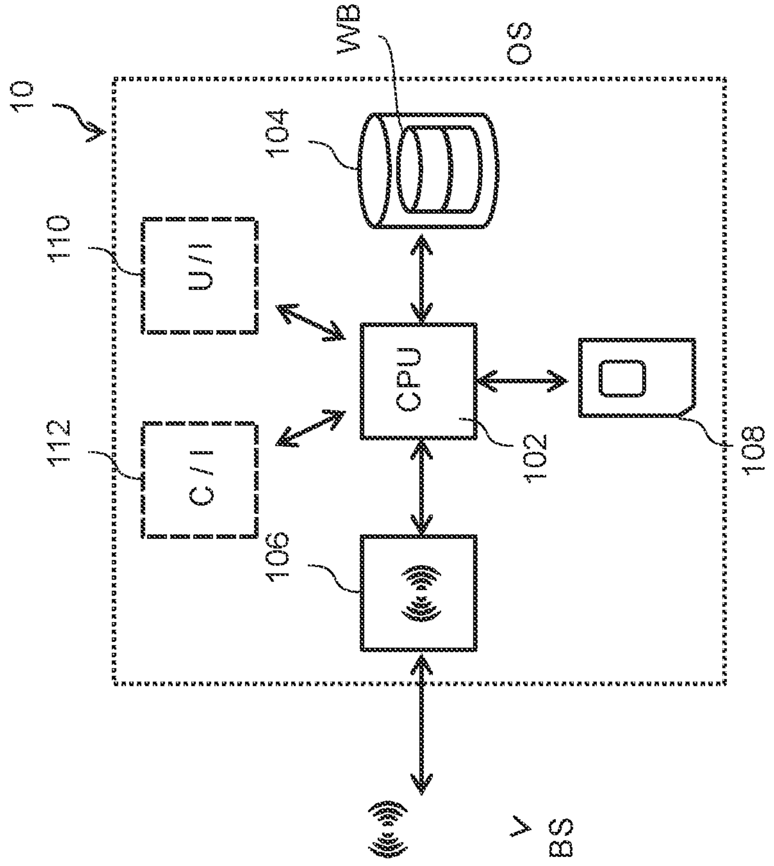
FIGS. 1 and 2 illustrate example embodiments of systems in which the described embodiments may be applied.

FIG. 1 shows a possible architecture of a "user equipment" 10, such as a mobile device, e.g., a smartphone or a tablet, or a mobile communication module usually to be used in embedded systems. The solution here described however is not limited only to secure element in mobile terminals, but may be applied also other secure elements, e.g., used in the automotive field. Operations described in the following may not be performed wireless, but may be performed using signal exchanges through cables, e.g., cables connected to a car on board unit.

Generally, the device 10 comprises one or more processors 102 connected to one or more memories 104. The device 10 comprises moreover at least one mobile communication interface 106 for communication, for example, with a base station BS.

For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

A mobile device comprises often also a user interface 110, such as a touchscreen. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

In the memory 104 may be stored, e.g., an operating system OS being executed by the processor 102 and which manages the general functions of the device 10, such as the management of the user interface 110 and/or the communication interface 112 and the establishment of a connection to the base station BS via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the identity identification of the user. For example, usually a mobile device comprises a card holder for receiving a card comprising a Subscriber Identity Module (SIM), which is usually called SIM card. Generally, a corresponding SIM module may also be installed directly within the device 10. For example, nowadays is often used a Universal Integrated Circuit Card (UICC), in particular a UICC e integrated directly in the device 10 called embedded UICC (eUICC), 108, which is a smart card often used in GSM and UMTS networks. The UICC ensures the integrity and security of all kinds of personal data and typically holds a few hundred kilobytes.

For example, in a GSM network, the UICC 108 contains a SIM application and in a UMTS network a USIM application. A UICC may contain several applications, making it possible for the same smart card to give access to both GSM and UMTS networks, and may also provide storage of a phone book and other applications.

Accordingly, the reference to a SIM module in the following of the present description is intended to include both 2G and/or 3G SIM modules and applies also the case in which such a SIM module is provided on a SIM card.

Figure 2:
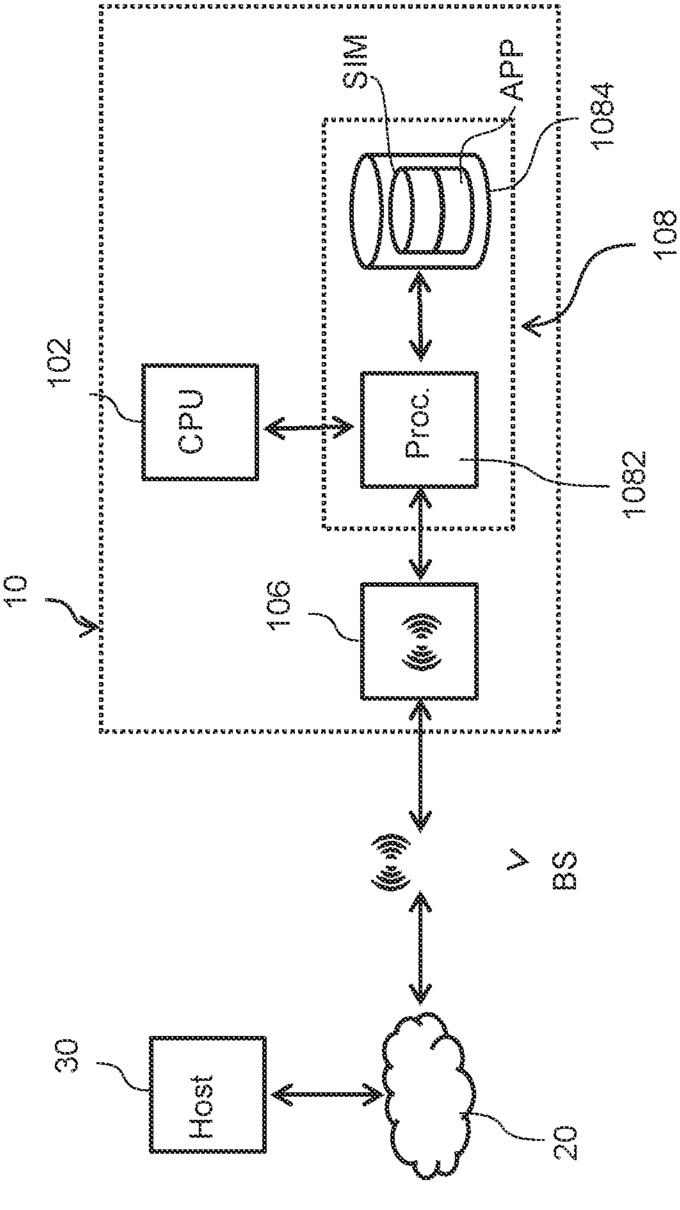

As shown in FIG. 2, a SIM module 108 often comprises one and more processors 1082 and one or more memories 1084 for executing applications stored in the memory 1084 of the module 108.

For example, the SIM module 108 may comprise in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. In variant embodiments, a script may be downloaded on an USB stick that is connected to a terminal, e.g., to a car board unit, in particular by a cable, and the script is downloaded to the card. In general, the method for performing an operative system update in a secure element may use mechanisms used to download a software patch, e.g., a patch download can also happen via USB stick.

For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 108.

Generally, the communication may be initiated by the host 30 or the UICC 108.

For example, the application APP may be a web server application, which receives requests from the web browser WB of a mobile device 10 and obtains respective content from a remote host 30, such as a web server.

The application APP may also be an authentication application. In this case, the host 30 may send an authentication request to the UICC 108 and the UICC 108 may send an authentication response to the host 30.

Figure 3:
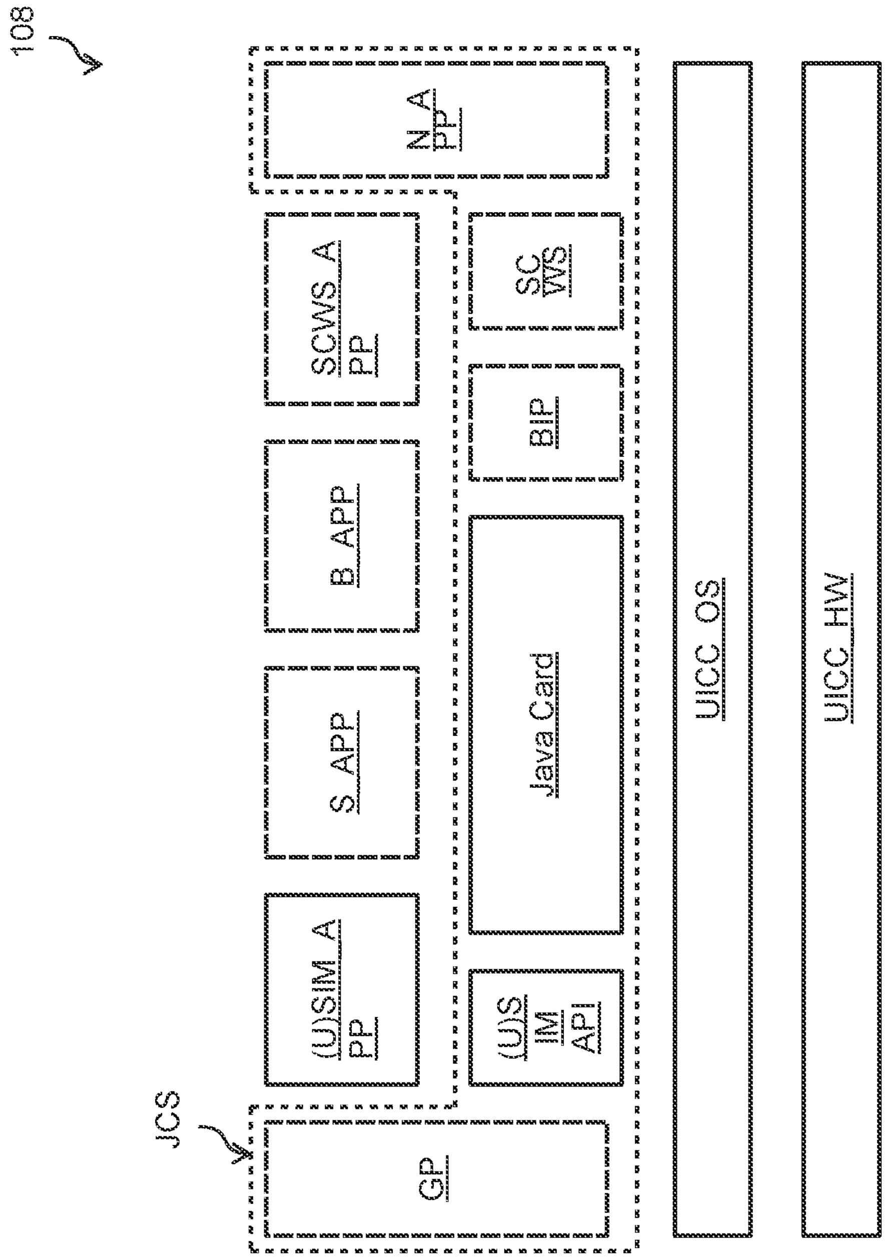
FIG. 3 illustrates an example embodiment of software layers of a Universal Integrated Circuit Card (UICC)

FIG. 3 shows in this respect a typical architecture of the software layers of a UICC card 108.

Substantially, a UICC 108 comprises a hardware layer UICC_HW being represented (at least) by the processor 1082 and the memory 1084. On top of the hardware layer UICC_HW runs an operating system UICC_OS of the UICC card.

Generally, the operating system UICC_OS may manage a plurality of applications.

For example, in the example considered, a runtime environment, such as a Java Card System JCS is executed by the operating system UICC_OS, which manages and runs applets, e.g., applications using the APIs (Application Programming Interface) provided by the runtime environment, e.g., the Java Card System JCS.

For example, the Java Card System JCS for secure elements used in telecommunication, may comprise usually a SIM and/or USIM API (identified with the reference sign (U)SIM API) which manages the basic Subscriber Identity Module commands and provides functions to higher level SIM or USIM applets (identified with the reference sign (U)SIM_APP).

Generally, the communication with the remote host 30 may be performed via short messages of a message service, such as the Short Message Service (SMS) and/or by means of a Bearer Independent Protocol (BIP), such as GPRS, EDGE, or UMTS. Accordingly, often the Java Card System JCS comprises a Bearer Independent Protocol API BIP.

The Java Card™ Platform provides a JAVA™ runtime environment, which is particularly optimized for smart cards. This technology is well known to those skilled in the art, rendering a more detailed description herein superfluous.

The Java Card System JCS is typically bundled, e.g., comprises, a GlobalPlatform software component or module GP according to a specification, such as the "GlobalPlatform Card specification", e.g., version 2.3.1. Also this standard is well known to those skilled in the art, rendering a more detailed description herein superfluous. Basically, the GP module provides features such as user authentication through secure channels, or the installation and remote management of the applets.

The above-mentioned API functions may then be used by applets, such as the SIM or USIM applet (U)SIM_APP, a basic applet B_APP and/or a secure applet S_APP.

Given the importance of secure elements, such as the integrated circuit card described with reference to FIGS. 1, 2, 3, in the embedded ecosystem, it is desirable for a secure element to provide is a software update/upgrade mechanism allowing both functional maintenance (e.g., bug fixing in application or operating system code) and application of security patches (e.g., new countermeasures on algorithms, new supported key sizes, resolution of vulnerabilities not known at the time of secure element certification) after the secure element has been deployed in the field.

This need becomes even more important when, due to secure element form factor or end-product constraints, the secure element is not easily replaceable (e.g., a secure element soldered on the PCB of the end product).

During an update of operating system or application, it is desirable to maintain the existing application user data as they may contain user information, user credentials, personalized/diversified keys, security status of the product, etc.

Data may be either originated by the user (like a PIN) or by the OEM (like a management key) or by the chip manufacturer (like a firmware update authentication key).

As mentioned above, in a runtime environment, such as GlobalPlatform, a technical standards organization may issue specifications and recommendations for secure elements which are widely used, it has been introduced a solution that allows the saving of data during an application update. Nevertheless, the method followed by this solution presents constraints if applied to an operating system update.

This solution that allows the saving of data during an application update is contained in a specification such as Amendment or Amd. H in GlobalPlatform (GlobalPlatform Technology Executable Load File Upgrade Card Specification v2.3—Amendment H, which as a whole identifies an API (Application Programming Interface) and it is indicated in the following as API Amd. H, and allows the saving of objects for the application with the following paradigm:

- a first package, for example, a first Java Card Package, is present on the secure element containing application binary code and an application instance;
- a new package, such as a new Java Card Package, containing a new binary code for the application is loaded on the secure element; and
- it is then provided performing an update of said first package (e.g., a Java Card package), in particular by executing a "Manage ELF Upgrade" command, where ELF is executable load file, which is in general a library or applicative package installed on the secure element and to be updated, such as a Java Card package, is sent, such command executing the following operations in the given order:

triggering the applet implementation of OnUpgradeListenrer.onSave( ) method, where the applet saves the information that needs to be preserved before loading the new package;

uninstalling the applet;

creating a new instance of the applet based on the code contained in the new package;

invoking the implementation of OnUpgradeListenrer.onRestore( ) method that recovers the objects saved previously by the onSave( ) method; and deleting the first Package with the associated original applet instance.

The API Amd. H may be considered to be comprised, in the schematics of FIG. 3, in the GlobalPlatform module GP.

In the API Amd. H if the applet has instance of classes defined in the package to be updated (the so-called custom classes), the structure of the classes may be updated during the ELF update procedure and the restore would be inconsistent. For this reason it is forbidden to save, in the onSave method, instances of custom classes. The Amd. H API defines the mechanism to preserve information in applet custom objects knowing that the update might change the applet logic and structures, hence requiring recreation of custom objects based on a new structure.

The API Amd. H however, as mentioned, refers to application/applet update and does not contain indications for the case of OS update, which changes non-custom/system objects.

The Applet update according the API Amd. H distinguishes the objects in two categories:

a first category is custom objects: instances of classes defined in the upgrading package. Custom objects cannot be saved by the applet, because their structure strictly depends on the logic defined in applet code and can change. But the applet in the onSave method can retrieve the content of the custom object and save it to restore in the onRestore method. By way of example, an applet "chair" has four object instances of a class "leg"; each of it has one field, "length" that is a short. The applet "chair" on the onSave cannot save the "leg" objects but it saves the four short numbers that are the four "length" fields. On the restore, it creates four empty "legs" object, and initializes each of that with the "length" fields retrieved from the saved information. The new "leg" objects may have also a different structure (e.g., a new field) that will be initialized according to the applet logic (e.g., it is assigned a default value); and a second category is system objects, or non-applet custom objects, which may be other, or non-custom, objects: Instances of classes defined by other packages (e.g., library package) or by the Java Card system (like byte array, keys, PINs, crypto objects, etc.). The classes of such objects will not be affected by the ELF update (as they are defined in a package that is not the one in update), so they will not change (e.g., by changing the fields, the methods, . . . ).

Hence, the applet can save the objects via the onSave method and restore them during the onRestore.

Figure 4:
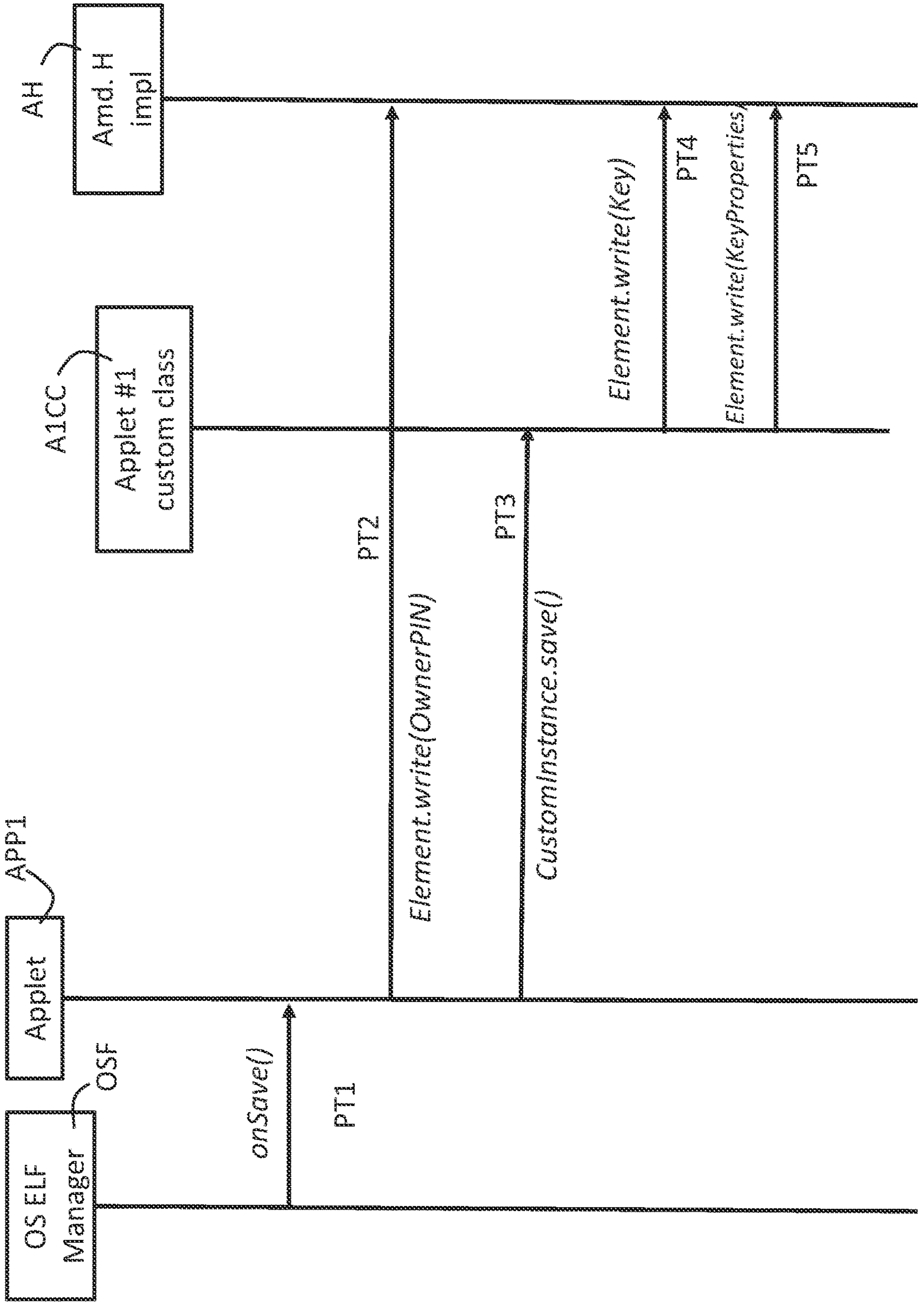
FIG. 4 illustrates a signal diagram of an operative system update.

In FIG. 4, in order to better understand the problems to be solved, it is shown a signal diagram which describes a procedure of an operative system update in a secure element if it is used the procedure of the API Amd. H for updating application.

An operative system update manager OSF, e.g., a software module operating analogously with respect to the ELF Manager, comprised in the Secure Element, e.g., eUICC 108, may invoke the onSave( ) method on an applet APP1, identified by a respective AID (Application Identifier), e.g., AID1, which in its turn may invoke a method Element.write (OwnerPIN) through the API Amd. H, indicated with AH, and a CustomInstance.save( ) method, which may be for an example a method defined in the object CustomInstance, an Applet APP1 Custom Class A1CC. Then in response to such last method invocation, e.g., a specific save method for a custom instance issued toward the corresponding custom class in the applet APP1, the Applet APP1 Custom Class A1CC may invoke the methods Element.write(Key) and Element.write(Keyproperties), which write the Key and Key properties as Custom Objects. The method Element.write (OwnerPIN) writes directly the non-Custom, or System, object.

An Element instance represents a generic object used to save the fields, e.g., attributes, of a custom object. In other words, a custom object that one would like to save but cannot save may be mapped to an Element instance that can be saved.

Thus an applet such as APP1 saves two types of objects:

a system object (saved directly), a system object; and a custom object; it cannot be saved directly, thus the object implements a save method that saves its referenced objects and fields.

In the example shown in FIG. 4 of a possible Amd.H approach to operative system update:

Owner PIN is a System Object, which is saved directly to API Amd. H AH, e.g., to a storage element provided for storing the objects used by API Amd. H AH, namely in the non-volatile memory of the secure element;

Key is a System Object. For instance the AESKey is defined by javacard.security package, so it can be saved in a generic "standard" Amd H scenario; and KeyProperties is a short data.

The different Element.write( . . . ) methods then allow filling the Element instance with the instance data of the non-custom object or other object. Using the Element.write (Object) method, it is possible to save any object reference except reference to a custom object.

In other solutions, the firmware update determines the loss of the data of the application, e.g., applet APP1. Thus, the device needs to be personalized again, over the air.

In other solutions (e.g., Android), application and data are separated (e.g., data are stored in a file system). This is not compatible with the Java card model where data and application are together.

It is also possible to specify that the applet uses external containers to store the data but, for specific objects, this is not secure (e.g., a key object contains a key that is stored protected by a XOR mask in Smart card memory); in addition, existing applets need to be heavily refactored to support this model.

In general, as mentioned, the update of the operating system may comprise that new binary code is stored which may be only represent an update of such operating system, while one or more applet may consequently modify their data to continue operating with the update operating system. Also, in embodiments, the new binary code may also include new binary code of the application, e.g., Java Packages to update.

Thus, in general, based on the above, the method for performing an operative system update in a secure element such as 108, here described, may provide comprising, in the secure element, e.g., 108, comprising stored an operative system exposing, e.g., making public, in particular to other classes, API functions, in particular in form of Java Card packages, classes and system objects and at least one application, e.g., APP1, comprising application binary code and an application instance,

- performing at least an operative system update operation storing new binary code in the secure element, e.g., 108, affecting said API functions and said update operation requiring preserving objects of said at least one application, e.g., APP1, on the secure element, e.g., 108;
- performing an update of said application, e.g., APP1, by saving, e.g., by the method onSave( ) by said at least one application APP1 objects (to be preserved during said update of said at least an application, e.g., APP1),
- uninstalling said at least one application, e.g., APP1,
- creating a new instance of said at least one application (APP1),
- recovering, e.g., by the method onRestore( ), said saved objects to be preserved in said new instance of said application, e.g., APP1,
- updating with said objects said at least one application, e.g., APP1, and
- said objects comprising custom objects, comprising instances of classes defined in said at least one application, and system objects.

Here updating said application may comprise updating the operative system performing modification of the application which affect the objects or may comprise also, in addition, updating the application itself, e.g., implementing a new version of the application.

However, performing the method performing an operative system update in a secure element in the form summarized above presents some further drawbacks.

Supporting critical Operating System updates including scenarios like the above-described ones implies it is not possible to rely on Element instances defined in Global Platform API Amd. H (because their implementation might be impacted too) and requires an additional low-level mapping mechanism between data structures of system classes among different versions of the Operating System. For instance, with reference to the example of FIG. 4, when the operative system is updated, in this case also the javacard.security package may change. This scenario is not managed by the API Amd H, that allows only package update and not operative system update.

A prerequisite of the API Amd. H is that Element instances can be handled by applets the same way they use normal Java Card objects: this means Element instances must be allocated in the Java Card heap and, consequently, their consistency cannot be guaranteed when an incoming Operating System update impacts the location of the Java Card heap or changes in system structures.

As previously explained, an applet update according to the amendment Amd. H distinguishes the objects in two categories:

- Custom objects: instances of classes defined in the upgrading package; and
- System objects (or Non Custom object): instances of classes defined by other application packages or by java card system (like byte array, keys, PINs).

While preservation of Custom objects may be already achieved by implementing proper patterns/strategies defined by the GlobalPlatform API Amd. H, the solution here described is further directed to preserve the objects different from the custom objects, in particular for the case the Operating System Update operation impacts the underlying structures of such objects. The objects are preserved, e.g., stored, and then reassigned to the objects of the application in the updated operating system (or also to the objects of an updated application in an updated operative system).

The solution here described is thus then based on recreating the actual information of a given object, namely an object different from a custom object, such information comprising the fields with the related properties and values defining and distinguishing such specific object instance from other objects of the same kind. This information content is independent from the underlying object data structure and does not change.

The solution here described, in other words, manage also the operative system update by serializing the content of the system object, such as the Key object mentioned with reference to FIG. 4. In that specific case, the applet does always the same operation: Element.write(key); in case of package update the Element.write simply stores the reference, in case of operative system update the write cannot store the reference, but serializes the object.

By way of more detailed example, for a Java Card Key object, "information content" corresponds to fields of type, size and value, and to the values in such fields as well, while for a PIN object "information content" corresponds to fields 'try limit', 'try counter', 'PIN value', and to the values in such fields as well. Fields may also include primitive fields for non-mutable data. It is underlined that constants, if seen as non-mutable data, are not part of the object, but of the code stored in the class.

Then, such actual information content contained into objects is translated into a self-descriptive compact format, which is independent from the Operating System object data structure hosting it, a "data serialization format" determining a serialized information content.

Such serialized information content is stored into a dedicated portion of a persistent memory of the Secure Element, e.g., a portion of a nonvolatile memory of the Secure Element, which is not affected by the Operating System update operation and, once the Operating System update operation has been completed, the serialized information content is "deserialized", decoded from the data serialization format to its previous format, e.g., Java Card field format, and converted into actual Java Card objects data structures defined by the new updated Operating System.

The solution then provides that, for system objects, all applications, specifically applets, wanting to preserve data in case of Operating System Update are configured to implement the onSave( )/onRestore( ) methods as they would do for standard Global Platform Amd. H application update: they can preserve/restore Custom objects using the Element.write(Object)/Element.readObject( ) methods as per the API Amd. H.

When an Operating System Update starts, the Operating System automatically invokes onSave( ) method of all such configured applets implementing the onSave( )/onRestore( ) methods.

When an Operating System Update completes, the system invokes the onRestore( ) method of the configured applets implementing the onSave( )/onRestore( ) methods.

The Operating System implementation is configured to:

- reserve a portion of non-volatile memory not to be affected by the Operating System Update to be used as temporary storage for application objects; and
- implement in the Element.write(Object) method logic to parse each application system object, of various kinds, and retrieve the actual information content to be preserved and used to recreate the system objects. In other words, the Element.write (object) of the API Amd. H is modified to include parsing the objects and their field, extracting for each object the fields with their values for instance as strings. As the system, e.g., device and card, knows the system object structure, it is able also to perform a mapping of a system object with a specific structure to a system object with a different structure (e.g., adding a field or changing a coding, etc.).

As an example, it may be considered an object "PIN" managed by the operating system. The PIN is coded in a class with a byte array of 8 bytes containing the PIN and a byte value indicating the remaining counter; an operative system upgrade may be performed which adds a checksum of the PIN value for security. When the upgrade is invoked, the onSave serializes the PIN object as follows:

```
A0 11 A1 02 3F11 A2 08 11223344FFFFFFFF A3 01 03
where:
    0xA0 is a tag container of the object serialization, with length 0x11 (17 bytes);
    0xA1 is an identifier, different for each object typology (key, PIN, ...); 0x3F11 in the above example represents the PIN object;
    0xA2 for the PIN type is the PIN value (on 8 bytes); and
    0xA3 for the PIN type is a counter.
```

When the operative system update is completed, the onRestore method de-serializes the PIN object and as the previous version of the PIN class didn't contain a checksum of the PIN, the checksum byte is computed by the onRestore method and set inside the PIN object:

- implement in Element.readObject( ) the logic needed to re-create Java card objects starting from the actual information content stored in the reserved memory. For instance a tag may be assigned to every different object and be able to identify and recreate the object when it is inflated. Any compact format to describe the informative content is suitable . . . ASN.1 or CBOR are other examples; and
- implement the serialization/deserialization algorithm to store the identifier of each original object and the associated information data in reserved memory.

Figure 5:
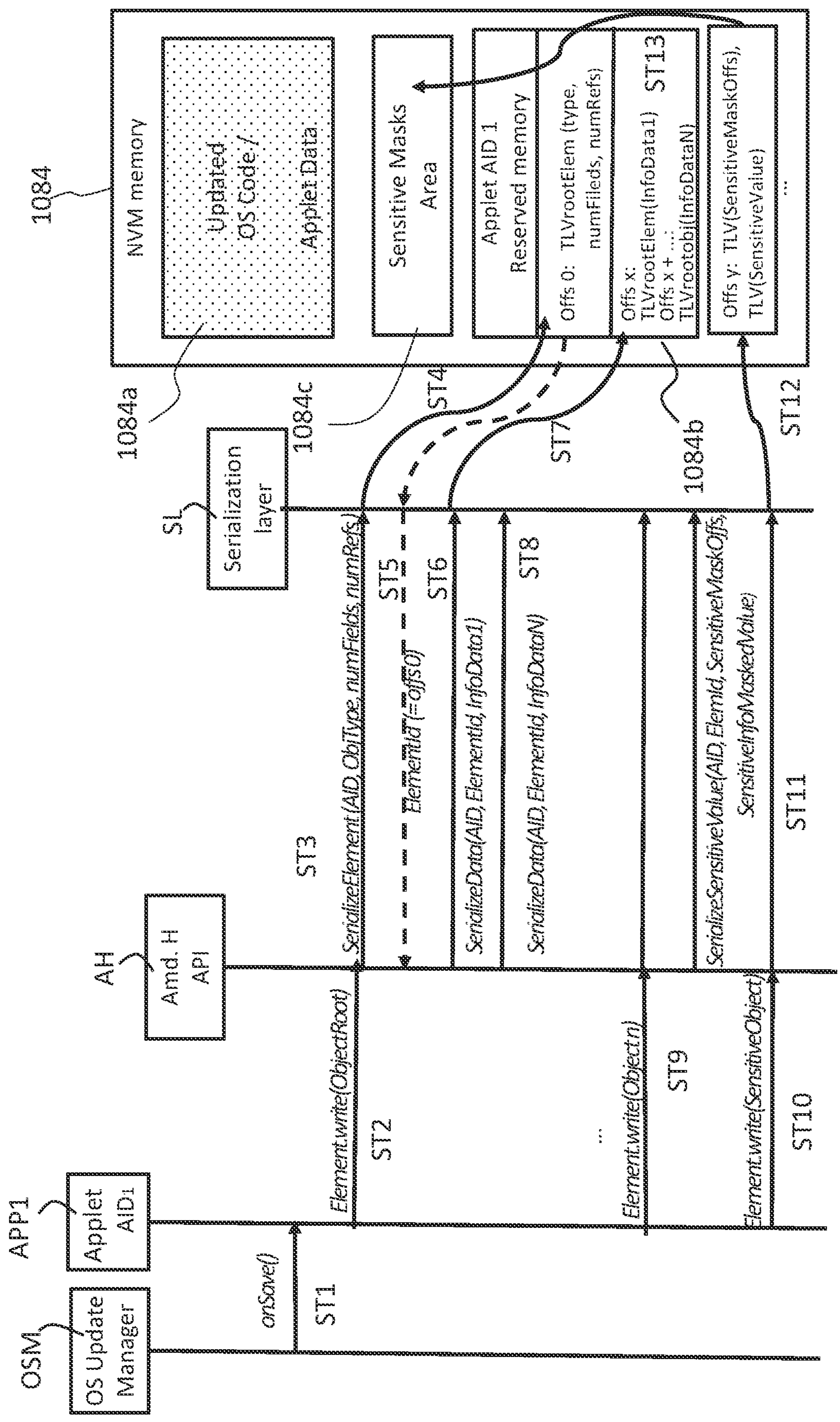
FIG. 5 is a signal diagram of an operation of the method according to embodiments.

The serialization procedure then, which is exemplified in FIG. 5, stores in persistent memory, e.g., the reserved NVM memory, all Element instances created at onSave( ) using a sequence of BER TLV (Basic Encoding Rules-Tag Length Value) coding, starting from the root of the instance data hierarchy of the given Application, e.g., applet APP1.

Regarding the TLV coding the following TLVs may be used for instance:

- a constructed TLV encoding the Element type with number of fields and number of references to other elements (action ST3 in FIG. 5), Constructed refers to the type of tag, primitive, e.g., a simple type like an integer, or constructed as it is the case, e.g., comprising more than a simple type, for instance a sequence;
- simple TLVs encoding each type of integral fields of each Element (e.g., boolean, byte, short, int) (action ST6 in FIG. 5);
- simple TLV encoding for references to other Element instances (e.g., offset within NVM area used for serialization) or arrays or null (action T6);
- a simple TLV for Boolean[ ], byte[ ], short[ ], int[ ] arrays with a fixed structure (action T6):
  - array type (it might also be defined by the 'Tag' itself);
  - memory type: persistent/CoR/CoD/global array created using JCSystem.makeGlobalArray( );
  - number of elements (or length in bytes); and
  - sequence of all their elements as sequence of bytes/short/ints.

In addition, regarding the reserved memory area in non-volatile memory, indicated respectively with 1084*b* and 1084 in FIGS. 2, 3, the reserved non-volatile memory 1084*b* data structure contains a table with a mapping of Instance identifiers AID, e.g., the AID of applet APP1, involved in the update and the offset value offs0 1 within reserved memory 1084*b* of the root TLV associated to the root Element are stored in secure NVM area is available.

As to sensitive objects, such as key instances, persistence of sensitive values (e.g., the value of Key instances) require special handling because they may be masked before being stored.

This can be achieved by defining a dedicated TLV encoding (action T4) to encode start offset of masked sensitive values and start offset of associated mask (random values).

Figure 7:
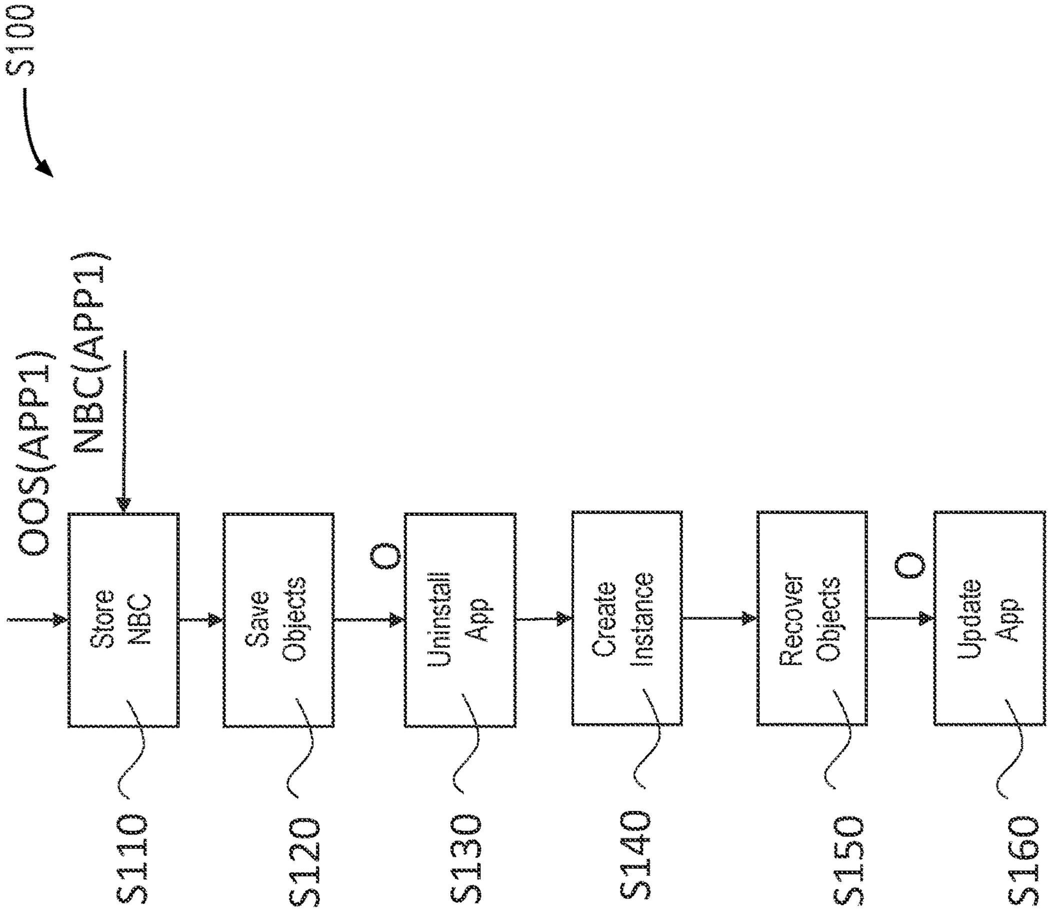
FIG. 7 is a flow diagram representing an embodiment of the method here described.

In FIG. 7 it is shown a flow diagram representing an embodiment of the method here described, indicated with the reference S100, for performing an operative system update in a secure element, in particular integrated circuit card like UICC, eUICC, iUICC, in particular using a scripting language platform, such as a Java Card platform.

Thus, as described above, such method provides that, in a secure element, e.g., an integrated card such as eUICC 108, comprising stored an operative system, e.g., and original or previous version of operating system OOS, exposing API functions, in particular in form of Java Card packages, classes and system objects, and at least one application, e.g., APP1, comprising application APP1 binary code and an application APP1 instance,

- performing at least an operative system update operation storing S110 new binary code NBC in the secure element, e.g., 108, affecting said API functions, said update operation including preserving objects of said at least one application, e.g., APP1, on the secure element, e.g., 108; and
- performing an update of said application, e.g., APP1, by:
  - saving S120, e.g., by the onSave( ) method or an analogous saving method, by said at least one application, e.g., APP1, objects O to be preserved during said update of said at least an application, e.g., APP1;
  - uninstalling S130 said at least one application, e.g., APP1;
  - creating S140 a new instance of said at least one application, e.g., APP1;
  - recovering S150, e.g., by the (onRestore( ) method or an analogous method, said saved objects O to be preserved in said new instance of said application, e.g., APP1;

updating S160 with said saved objects O said at least one application, e.g., APP1, and such objects O comprising custom objects CO, comprising instances of classes defined in applications, and system objects SY.

Figure 8:
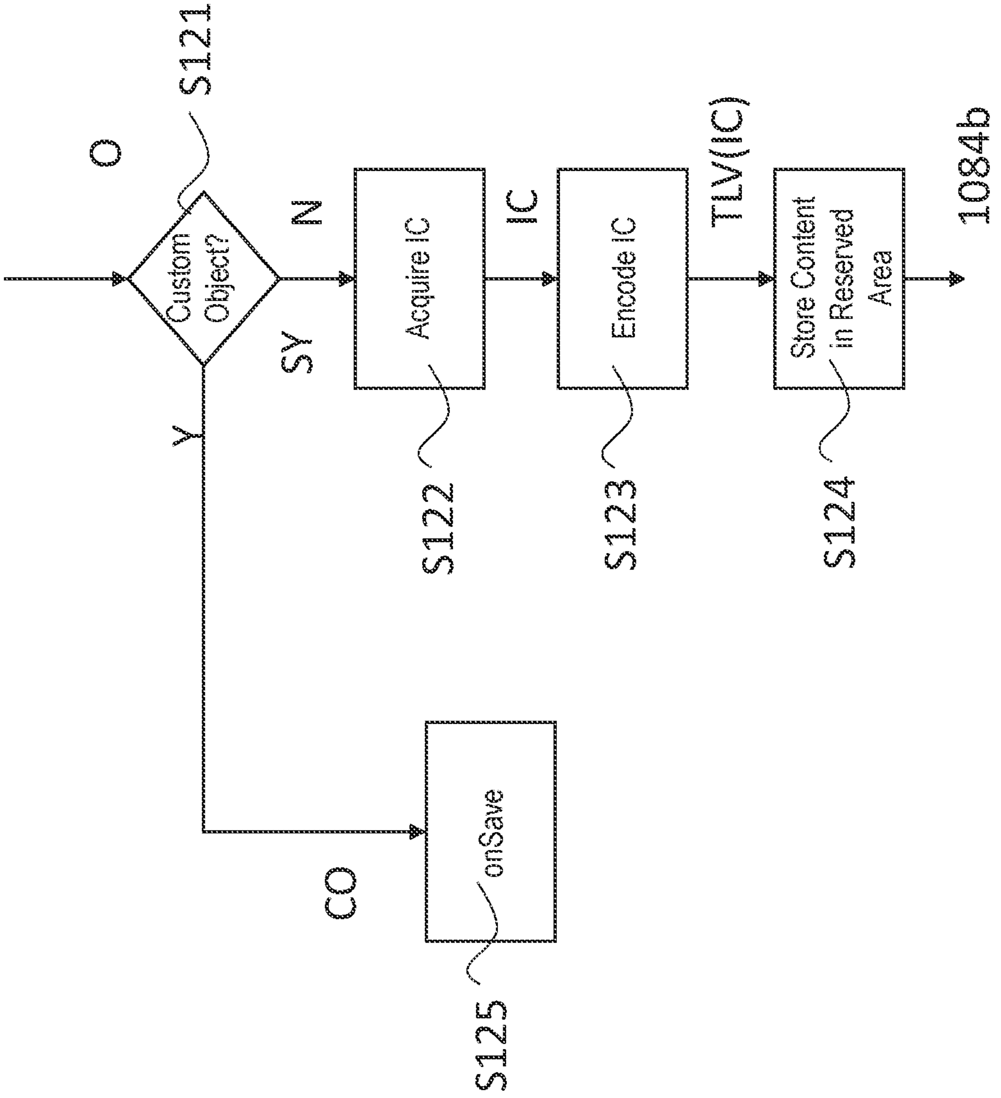
FIG. 8 and FIG. 9 are flow diagrams representing operations of the method of FIG. 7.
Figure 9:
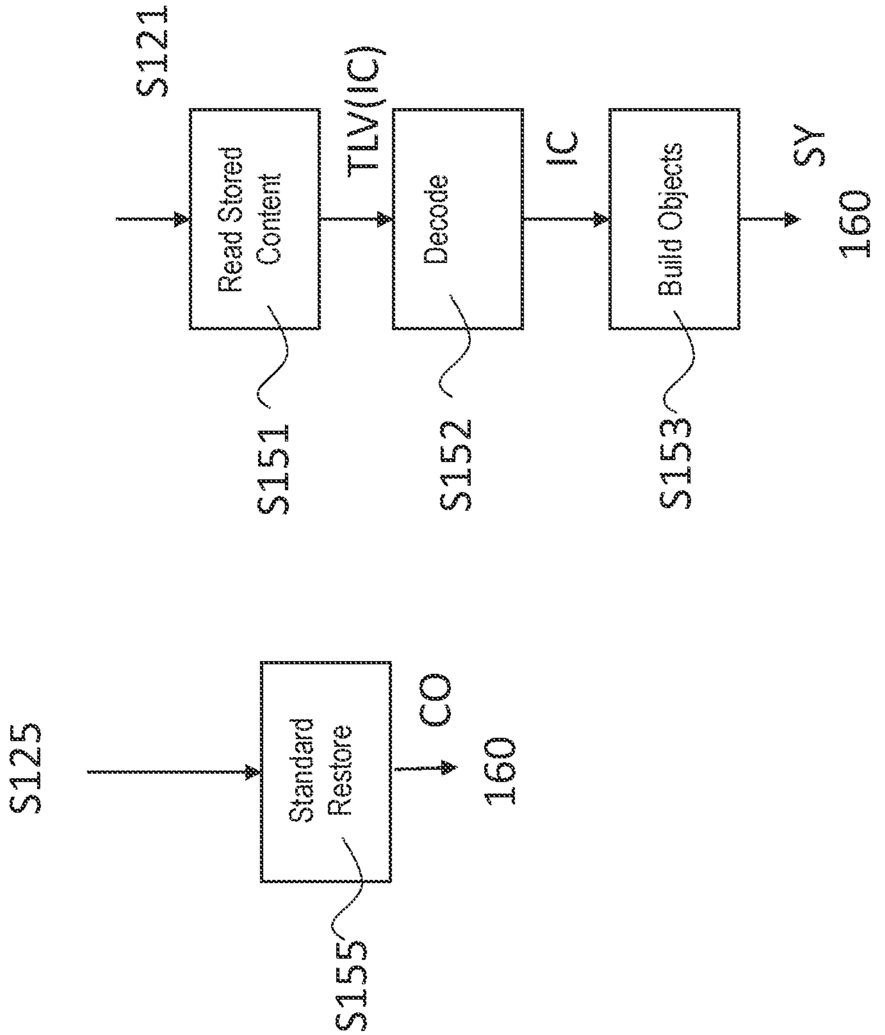

The method provides then, with reference to FIGS. 8 and 9, that saving system objects SY to be preserved comprises:

acquiring S122 an information content (C) in the fields of a given system object SY;

encoding S123 said information content IC into a data serialization format, determining a serialized information content TLV(IC), in particular by TLV encoding; and storing S124 said serialized information content TLV(IC) in a reserved area, e.g., 1084*b*, of a non-volatile memory of said secure element, e.g., 108, not affected by the operative system update, while said recovering, e.g., onRestore( ), comprising:

reading S151 said serialized information content TLV (IC from said reserved area of the non-volatile memory 1084 of said secure element 108, performing a decoding S152 from said data serialization format of said serialized information content TLV(IC), obtaining the information content IC in the fields of said given system object, building said given system objects SY with the obtained fields as fields of said given built system object SY, and updating with said given system object SY said new instance of application.

In general a software module in the form of a binary image is provided, which may include one or more Java Card packages among other software elements and sub-modules. As described above the operation of saving S120 by the onSave( ) method by said at least an application APP1 objects to be preserved according to the present solution provides that, as shown in FIG. 8 illustrating the steps of such operation S120, comprises in a step S121 to check if the object or objects O to be preserved are objects comprising custom objects CO, comprising defined instances of classes, or not, e.g., system objects SY. Operation S120 is representative of an evaluation which may be performed in different ways and times, not necessarily when the saving S120 is requested. In particular, the objects O to be moved and their nature can be determined before and indicated when the new binary code NBC is transmitted or within the new binary code NBC, in which case operation S121 correspond to extract such indications from the new binary code NBC.

In the negative, e.g., objects are system or system objects SY, the operation S120 of saving system objects to be preserved, in particular in said at least application APP1, comprises:

acquiring S122 an information content IC in the fields of a given system object SY, encoding S123 said information content IC into a data serialization format, determining a serialized information content TLV(IC), in particular by TLV encoding, and storing S124 said serialized information content TLV(IC) in a reserved area, in particular 1084*b* as shown in the following, of the non-volatile memory, e.g., 1084, of said secure element, e.g., eUICC 108, not affected by the operative system update.

In the affirmative, e.g., in case step S121 determines a custom object CO, the standard onSave( ) method of the API AH is used in a step S125. Subsequently, in correspondence of step S150, a standard Restore( ) method of the API AH is used to restore the custom objects CO in a step S155 (shown in FIG. 9).

Then according to the solution here described, the recovering operation S150, as shown in FIG. 9 illustrating the steps of such operation S150, comprises in a step comprising:

reading S151 said serialized information content TLV(IC) from said reserved area 1084*b* of the non-volatile memory 1084 of said secure element, and performing S152 a decoding from said data serialization format of said serialized information content TLV(IC), obtaining the information content IC in the fields of said given system object, then building S153 said given system objects SY with the obtained fields as fields of said given built system object.

It is here specified that the method may provide performing the operations of the method, e.g., from S120 to S152, also on system objects, to be preserved in said at least application APP1 by effect of the new binary code NBC, which are not updated. In general, it may be not known during the update of the operating system if a given specific system object will be updated or not. Since the system object, as also explained in the following, is first serialized then deserialized, if such system object is not changed for the update, in any case the serialization/deserialization does not affect such object. In an embodiment, however the method here described operates only on system objects to be preserved in said new binary code NBC which are to be updated. For example, system objects to be updated may be identified by the application.

Then the operation S160 of assigning said given system object to said at least application APP1 is performed.

In FIG. 5 it is shown a signal diagram representing transactions of the step S123 which operates the serialization of the information content IC.

Thus, an OS Update Manager OSM, which, as the File Update Manager OSF may be a software module comprised in the Secure Element, e.g., eUICC 108, is configured to invoke, in a transition ST1, an onSave( ) method on the application, or applet, APP1.

The applet APP1 in its turn invokes, ST2, an Element-.write method for each of the n system object SY which is obtained from the parsing operation in step S122, e.g., as shown in the diagram ObjectRoot, then n+1 till the n-th Object n (for which for simplicity transaction ST7 is indicated) and a Sensitive Object.

The method Element.Write (ObjectRoot), directed to the Amd. H API AH has the Amd. H API AH invoke, transaction ST3, a SerializeElement (AID, ObjType, numFields, numRefs) method, which arguments are the applet identifier AID, then fields, type of object Objtype, number of fields NumFields and number of references, extracted by the object SY, on a Serialization Layer SL.

In its turn the Serialization Layer SL performs the serialization as follows (transaction ST4).

Figure 6:
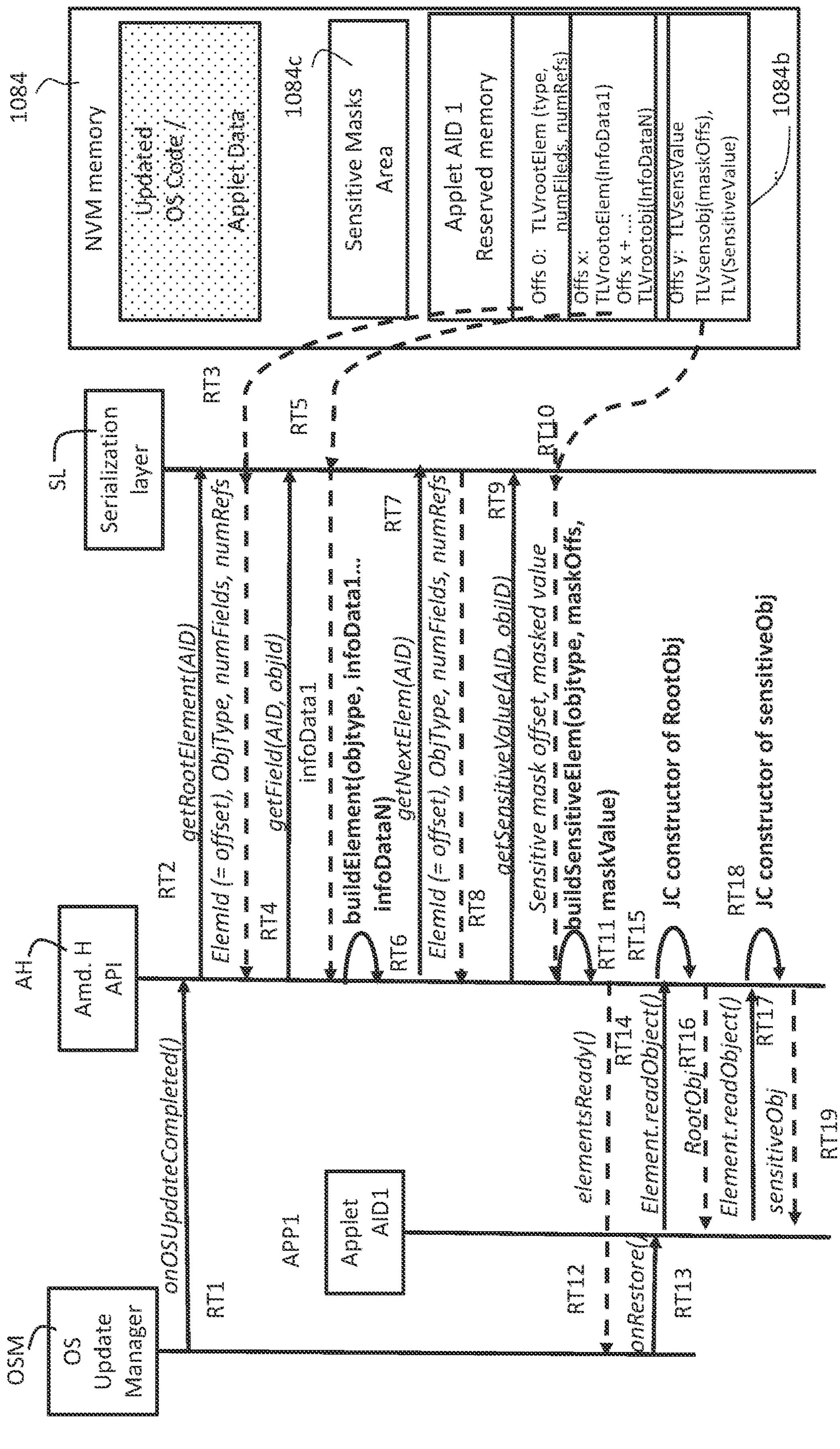
FIG. 6 is a signal diagram of a further operation of the method according to embodiments.

A NMV memory 1084 of the card is indicated in FIG. 6 which stores the Updated OS Code/Applet Data in portion 1084*a*. A reserved memory portion 1084*b* is also comprised in the NVM memory 1084, which stores applet APP1 data. The serialization layer SL writes, for instances, in transaction ST4 at an address of the reserved memory portion 1084*b* assigned to the applet APP1 indicated by the identifier AID, with a given starting offset Offs 0, a TLV coded version of the fields Objtype, numFields, Numrefs of the RootElement, e.g., header fields which describe the type of object SY, the number of its fields and references. An ElementId information comprising the starting offset Offs 0 value at which the reserved storage for applet APP1 has begun writing the Object Root is returned (transaction ST5 from memory 1084) to the Serialization Lauer SL and then to Amd. H API AH, so that the serialization data method which follows is performed as SerializeData(AID, ElementId, InfoData1), indicated by transactions ST6, e.g., has for arguments the applet identifier AID, e.g., AID1 for applet APP1, ElementId field which indicates the offset within the sub-portion of reserved memory 1084*b* dedicated to applet APP1, and a block of information content InfoData1, which correspond to a field of the system object SY. This is written (transaction ST7) at the following offset value, Offs x, indicating free space after the initial writing. If several, e.g., N, blocks of information content are available, for instance corresponding to N fields, InfoData1 . . . InfoDataN, they are written, TLV coded, at offset location Offs x . . . Offs x+N. In FIG. 5 only the N-th SerializeData(AID, ElementId, InfoDataN) method is shown, associated with transaction ST8, although of course many other transactions, in particular N−2, of the type ST6-ST7, may be present.

The method Element.write(SensitiveObject) is invoked (action ST10) also by the applet APP1 on the Amd. H API AH, which invokes a sensitive object serialization method, SerializeSensitiveValue(AID, ElemId, SensitiveMaskOffs, SensitiveInfoMaskedValue)) which supplies, ST11, the fields of the Sensitive Value on the SerializationLayer SL, where ElementId still indicates the offset within the sub portion of reserved memory 1084*b* dedicated to applet APP1, as the Sensitive Object represents a n+1 object, SensitiveMaskOffs indicated an address offset in a Sensitive Masks Area 1084*c* in the NVM 1084 in which store, ST13, the Sensitive Object Mask, and SensitiveInfoMaskedValue indicating the value (mask and masked value) of a masked information contained in the sensitive object.

As shown in FIG. 6 the Serialization Layer SL writes ST12 at an Offset y, which value follows Offset X+N, a TLV coding of the mask offset SensitiveMaskOffs and a TLV coding of the sensitive value, TLV(SensitiveMaskOffs), TLV(SensitiveValue), which mask is stored at the address indicated by the mask offset SensitiveMaskOffs in the Sensitive Masks Area 1084*c*.

The one just described is one of the possible way to perform the saving system objects SY to be preserved in said update encoding ST11 in a data serialization format information for transforming a plaintext in a cypher text, in particular at least a cypher key. A mask may be used to avoid disclosing sensitive data but the solution here described also may operate in embodiments with any other means that hides plaintext data obtaining a cypher data, e.g., encryption with a well-known key instead of a mask may be performed. If encryption is performed on the data, namely on the sensitive values, using a key, there is of course no ‘mask offset’ but a ‘key address+encryption method’.

Thus, as shown, such operation of saving system objects SY to be preserved in an at least an application APP1, affected by the new binary code NBC comprises:

writing, such as in action ST2, elements, e.g., by write.Elements( ) method, corresponding to the system object SY, the acquiring field comprising parsing, e.g., action ST4, using SerializeElement( ) method, such system object SY to obtain, by action ST5-ST8 which number depends on number N of fields, such fields and corresponding values, e.g., InfoData1 . . . InfoDataN, of the information content IC, encoding S122 said fields InfoData1 . . . InfoDataN into a data serialization format, such as TLVrootObj(InfoData1) . . . TLVrootObj(InfoData1N), determining a serialized information content TLV(IC), in particular by TLV encoding, and storing, e.g., action ST4, said encoded fields, such as TLVrootElem(InfoData1) . . . TLVrootElem (InfoData1N) and corresponding values in a portion of said reserved area 1084*b* corresponding, e.g., indicated by application identifier AID1, to the application APP1 starting from a given offset Offs x.

Then, such writing, ST2, Elements corresponding to the system object SY comprises extracting header fields, from the Root Object in particular, which in particular describe the type of object, the number of its fields and references, e.g., AID, ObjType, numFields, numRefs, encode said header fields and store them at an initial offset value, Offs 0, of the portion of said reserved area 1084*b* corresponding to the application APP1, such given offset Offs x starting after said encoded header fields, e.g., TLVrootElem (type, numFields, numRefs). The Root Object is referenced in the Amd. H specification. Actually all the system objects that are stored via “Element.write” are leaves or branches of an object tree that has the Root Object as Root. The operation described above substantially implements the same structure, but instead of having a Reference Tree, are structured branches and leaves as offsets inside the big array containing the serialization of all the objects.

In FIG. 7 it is shown a signal diagram of the deserialization procedure which is performed during decoding S153 in recovery S150.

The OS Update Manager OSM, when the OS update is complete, invokes RT1 onOSUpdateCompleted( ) method on the Amd. H implementation API AH.

The Amd. H implementation API AH issues RT2 a getRootElement(AID) method to the Serialization Layer SL to get RT3 in the Root Element with identifier AID, corresponding in the example to applet APP1, e.g., at the offset Offs 0 in the reserved portion 1084*b* of the NVM 1084, the information stored with transaction ST4 during operation S123, in the example the type of object Objtype, the number of fields NumFields and the number of references numRefs, together with ElemId (=offset), e.g., the information on the offset within the subportion of reserved memory 1084*b* dedicated to applet APP1 from which the other information is got, then applying TLV decoding. Thus, an Element structure is initialized with the values in object Objtype, the number of fields NumFields and the number of references numRefs, e.g., the header fields.

Then a getField (AID, ObjId) method to the Serialization Data, transaction RT4, determines the action of getting RT5, applying TLV decoding, the first block Infodata1, corresponding in particular to a first field of the object SY to be preserved. Assuming transaction RT5 is performed for all the blocks Infodata1 . . . InfodataN, then performing RT6 a buildElement (objtype, Infodata1 . . . InfodataN) method, to build, in the API AH, the Element with the given objtype, containing blocks Infodata1 . . . InfodataN.

Then, a getNextElem(AID) method gets RT7 the fields corresponding to a next object with identifier AID store in Next Element with the same identifier AID, obtaining, applying TLV decoding, from the area 1084*b* again ElemId (=offset), ObjType, numFields, numRefs, regarding such next object. Of course the offset here is offset of the Next Element. A buildElement method with corresponding information content data obtained from the NVM 1084 then ensues, event if not shown.

When all the Elements are built, Sensitive Elements are built, starting with a getSensitiveValue(AID, objID) (RT9)

which gets, applying TLV decoding, the Sensitive mask offset and masked value in the NVM 1084, accessing RT10 the Sensitive Object Mask, and SensitiveInfoMaskedValue in the NMV reserved portion 1084*b*.

Subsequently, a buildSensitiveElem(objtype, maskOffs, maskValue) method is invoked, action RT11, building, in the API AH, the Sensitive element according to the obtained object type, storing in it the sensitive mask offset and masked value.

Then the API AH issues RT12 to the OS Update Manager OSM an elementsReady( ) method, signalling that all the required Elements are Ready.

Only then the OS update manager OSM invokes RT13 an onRestore( ) method on the applet APP1, which issues RT14 an Element.readObject( ) to read an object of an element. In the API AH a Java code constructor of the RootObject is executed RT15, returning R16 the Rootobject to applet APP1. Also, for sensitive objects, another Element.readObject( ) is issued RT17, to read the sensitive object, then in the API AH a Java code constructor of the Sensitive oBject is executed RT18, returning RT19 the Sensitive object to applet APP1.

Thus, reading S151 the serialized information content TLV(IC) from the reserved area of the non-volatile memory 1084 of the secure element, e.g., eUICC 108, comprises reading said fields InfoData1 . . . InfoDataN into a data serialization format TLVrootElem(InfoData1) . . . TLVrootElem(InfoData1N) in the reserved memory 1084*b*, performing S152 a decoding from such data serialization format of said serialized information content TLV(IC), obtaining the information content IC, or InfoData1 . . . InfoDataN, in the fields of said given system object SY, then building S153 said given system objects SY with the obtained fields as fields of said given built system object by introducing, using action RT6, buildElement(objtype, infoData1 . . . infoDataN), said fields in an Element structure.

Then, the operation of reading provides also reading said header fields, encoded in TLVrootElem (Objtype, numFields, numRefs) from the initial offset address (Offs 0) in such portion of reserved memory 1084*b*, performing S152 said decoding of said header fields, obtaining AID, ObjType, numFields, numRefs, initializing said Element structure with said header fields AID, ObjType, numFields, numRefs. In other words, the header fields are used to define the Element structure for the object, which is then filled with decoded fields InfoData1 . . . InfoDataN.

As to sensitive objects, on the whole, in case of a masked sensitive objects, saving system objects SY includes encoding ST11 in a data serialization format value a sensitive masked value SensitiveInfoMaskedValue and an offset address SensitiveMaskOffs pointing to a separate mask memory 1084*c* in said non-volatile memory 1084 where a corresponding mask is stored, and storing said sensitive masked value SensitiveInfoMaskedValue and an offset address SensitiveMaskOffs in the reserved memory 1084, reading S151 said serialized information content from said reserved area of the non-volatile memory 1084 then comprises reading such values Sensitive mask offset, masked value from said reserved area 1084*b* and said mask value from said mask area 1084*c* to build, e.g., buildSensitiveElem (objtype, maskOffs, maskValue the corresponding sensitive object.

As already indicated the method here described refers in general to cases where the update regards the Operating system, thus new binary code is stored which may be only represent an update of such operating system, while one or more applet may consequently modify their data structures to continue operating with the update Operating system. According to the solution here described, this is performed using the described saving and restoring operation which for custom objects of the application follow substantially the saving and restoring operations such as the one described in Amd.H, while for system objects includes the serialization/deserialization just described.

Thus, in general the solution here described refers to a method for performing an operative system update in a secure element, in particular integrated circuit card like UICC, eUICC, iUICC, in particular using a Java Card platform, such as integrated circuit card like UICC, eUICC, iUICC, comprising:

- in a secure element, e.g., 108, comprising stored an operative system and at least one application (APP1), comprising application (APP1) binary code and an application (APP1) instance,
- performing at least an operative system update operation storing new binary code in the secure element, e.g., 108, said update operation requiring saving and restoring objects of said at least one application, e.g., APP1 on the secure element, e.g., 108;
- performing an update of said application, e.g., APP1), by:
  - saving, e.g., by the onSave( ) method, by said at least one application, e.g., APP1 objects, such as object CO, SY to be preserved during said update of said at least an application, e.g., APP1;
  - uninstalling said at least one application, e.g., APP1;
  - creating a new instance of said at least one application, e.g., APP1;
  - recovering, e.g., by the method onRestore( ), such saved objects, e.g., CO, SY, to be preserved in said new instance of said application, e.g., APP1;
  - updating with said saved objects, e.g., CO, SY said at least one application, e.g., APP1; and
  - said objects, e.g., CO, SY comprising custom objects, e.g., CO, comprising instances of classes defined in applications, and system objects, e.g., SY,
  - wherein
  - saving system objects, e.g., SY to be preserved comprises:
    - acquiring, e.g., by operation S122, an information content, IC, in the fields of a given system object, SY;
    - encoding, e.g., by operation S123, said information content, IC into a data serialization format, determining a serialized information content, such as TLV(IC), in particular by TLV encoding; and
    - storing, e.g., by operation S124, said serialized information content, e.g., TLV(IC), in a reserved area, such as 1084*b*, of a non-volatile memory of said secure element not affected by the operative system update; and
  - said recovering, e.g., by the method onRestore( ), comprising:
    - reading, e.g., S151, said serialized information content (e.g., TLV(IC), from said reserved area of the non-volatile memory, e.g., 1084, of said secure element, e.g., card 108;
    - performing a decoding, e.g., by operation S152, from said data serialization format of said serialized information content, e.g., TLV(IC), obtaining the information content, e.g., IC, in the fields of said given system object, building said given system objects, e.g., SY, with the obtained fields as fields of said given built system object, e.g., SY; and updating with said given system object, e.g., SY, said new instance of application.

More specifically, if the application APP1 is stored as Java card package and relies on classes defined in Java Card packages belonging to the operating system (e.g., Java Card API, GlobalPlatform API, etc.), in case of operating system update affecting such API packages, APP1 can preserve its objects (including system ones) by following the API Amd.H for the update of executable load files, e.g., for the custom objects the operations for the Amd.H.

The at least one application, e.g., APP1, may be comprised in a first Java Card Package, e.g., PK1, or executable load file, stored in the secure element, e.g., 108, the method including to perform such at least an operative system update operation storing new binary code in the secure element, e.g., 108, said update operation requiring saving and restoring objects of said at least one application, e.g., APP1, on the secure element, e.g., 108, loading a new Java Card package, e.g., PK2, or executable load file comprising new (updated) binary code to be introduced in said at least an application, e.g., APP1, saving, e.g., onSave, by said at least an application, e.g., APP1, objects, e.g., O; CO, NCO, to be preserved in said update, uninstalling said at least an application, e.g., APP1, creating a new instance of said at least an application, e.g., APP1, in the new Java Card package, e.g., PK2, recovering, e.g., onRestore, e.g., said saved objects, e.g., O; CO, NCO, to be moved in said new instance of said application, e.g., APP1, in said updated package, e.g., PK2, moving said objects, e.g., O; CO, NCO, to said update package, e.g., PK2, deleting said first package, e.g., PK1, and said objects, e.g., O; CO, SY, comprising custom objects, e.g., CO, comprising instances of classes defined in the update package, e.g., PK2, and system objects, e.g., SY, wherein saving system objects, e.g., SY, to be preserved in said update package, e.g., PK2, comprises:

acquiring, e.g., S122, an information content, e.g., IC, in the fields of a given system object, e.g., SY;

encoding, e.g., S123, said information content, e.g., IC, into a data serialization format, determining a serialized information content, e.g., TLV, e.g., IC, in particular by TLV encoding; and storing, e.g., S124, said serialized information content, e.g., TLV, e.g., IC, in a reserved area, e.g., 1084*b*, of a non-volatile memory of said secure element not affected by the operative system update; and said recovering, e.g., onRestore, e.g., comprising:

reading, e.g., S151, said serialized information content, e.g., TLV, e.g., IC, from said reserved area of the non-volatile memory, e.g., 1084, of said secure element, e.g., 108;

performing a decoding, e.g., S152, from said data serialization format of said serialized information content, e.g., TLV, e.g., IC, obtaining the information content, e.g., IC, in the fields of said given system object, building said given system objects, e.g., SY, with the obtained fields as fields of said given built system object, e.g., SY; and updating with said given system object (SY) said new instance of application.

Therefore, the method here described in a more general case may provide updating only the operating system, e.g., it is downloaded a patch to the operative system changing, e.g., the RSAKey system API class, with no change of the applet code. In this case, if there is a Package PCK1 for the applet code, such product, e.g., applet, does not change, it is changed, e.g., a RSAKey object in the applet. Thus, in this case, an applet package, e.g., PK2, is not downloaded together with the patch, but the applet upgrade Amd. H procedure (by onsave/onrestore methods) is executed on the same applet package to recreate the RSAKey object which was impacted by the update. So the applet instance is deleted and re-installed in the same package, that, as it does not change, is not part of the binary code downloaded. In further case, it is downloaded a patch that changes also the applet code, e.g., both the operating system code and the applet code; in this case, a package, e.g., PK2, is downloaded with the patch and the Amd H procedure is performed to update the applet objects as above, but also to migrate the applet instance from the first version of the corresponding package, e.g., PK1, of the applet to the second version of the package, e.g., PK2.

It is specified that updating with said given system object SY said new instance of application includes that the objects may be simply moved to new instance of the application, but also their structure, not only the contents of the fields, may be modified by the operating system update, e.g., a further field is added, thus in general the system object SY updates said new instance of application.

From the description here above thus the advantages of the solution described are clear.

Advantageously, the model is based on a standard API (Global Platform Amd. H), so it is interoperable.

Also, it preserves security of data (sensitive data remains masked).

This because of the usage of standard API and of inner Operating System mechanism (transparent to applications) to avoid exposing data.

Without prejudice to the underlying principles, the details and embodiments may vary, even significantly, with respect to what has been described by way of example only, without departing from the extent of protection.

It is to be noted that also multiple packages can be updated together, e.g., if the applet uses also another package that also needs to be updated; in this case a custom class is a class belonging to any of the package in update.

The solution described herein refers to a secure element, in particular an eUICC or iUICC or UICC, configured to perform a method according to embodiments, including:

a memory (configured to store in a reserved area said encoded data; and a one or more processors configured to manage the operations of said method. Such a secure element may also be a secure element not used in the telecom field, such as an ID card, a wearable, a chip soldered in a car vehicle, secure elements hosted in USB keys and so on, provided that used Java Card Packages and, in particular, Global Platform.

The apparatus here described may include a mobile communications apparatus, however the updated operative system, or application packages may be made available by other means (e.g., a manufacturer representative bringing the material over a disk, USB key or any other suitable support, then it is downloaded the material on the secure element using a smart card reader.

Encoding the information content (IC) into a data serialization format, determining a serialized information content may be performed by TLV encoding, or by another type of encoding, not necessarily of the Length-Value type. For instance ASN.1 or CBOR may be used.

The integrated circuit cards may also correspond to a non-telecom cards, such as a banking card, e.g., credit card, or other embedded cards, also for M2M.

A method for performing an operative system update in a secure element, in particular including Java Card System and GlobalPlatform component, in particular integrated circuit card like UICC, eUICC, iUICC, said method may be summarized as including: in a secure element (108) including stored an operative system exposing API functions, in particular in form of Java Card packages, classes and system objects and at least one application (APP1), including application (APP1) binary code and an application (APP1) instance; performing at least an operative system update operation storing new binary code (NBC) in the secure element (108), affecting said API functions and said update operation requiring preserving objects of said at least one application (APP1) on the secure element (108); and performing an update of said application (APP1), by: saving (onSave( )) by said at least one application (APP1) objects (O; CO, SY) to be preserved during said update of said at least an application (APP1); uninstalling said at least one application (APP1); creating a new instance of said at least one application (APP1); recovering (onRestore( )) said saved objects (O; CO, SY) to be preserved in said new instance of said application (APP1); updating with said saved objects (O; CO, SY) said at least one application (APP1); and said objects (O; CO, SY) including custom objects (CO), including instances of classes defined in applications, and system objects (SY); wherein saving system objects (SY) to be preserved includes: acquiring (S122) an information content (IC) in the fields of a given system object (SY); encoding (S123) said information content (IC) into a data serialization format, determining a serialized information content (TLV(IC)), in particular by TLV encoding; and storing (S124) said serialized information content (TLV(IC)) in a reserved area (1084*b*) of a non-volatile memory of said secure element not affected by the operative system update; and said recovering (onRestore( )) including: reading (S151) said serialized information content (TLV(IC) from said reserved area of the non-volatile memory (1084) of said secure element (108); performing a decoding (S152) from said data serialization format of said serialized information content (TLV(IC)), obtaining the information content (IC) in the fields of said given system object, building said given system objects (SY) with the obtained fields as fields of said given built system object (SY); and updating with said given system object (SY) said new instance of application.

Said at least one application (APP1) may be included in a first Java Card Package (PK1) or executable load file, stored in the secure element (108), the method including to perform at least an operative system update operation storing new binary code in the secure element (108) including both updates to the API functions and to the application (APP1) code, in particular said update operation requiring saving and restoring objects of said at least one application on the secure element, loading a new Java Card package or executable load file including new binary code to be introduced in said at least an application (APP1).

Said platform may be GlobalPlatform and said operative system update may rely on an Amendment H API of said GlobalPlatform by performing said saving operation by using an onSave( ), in particular OnUpgradeListener.onSave( ) method of Amendment H API and restoring by using a onRestore( ), in particular OnUpgradeListener.onRestore( ) method of Amendment H API.

Said saving system objects (SY) to be preserved in said update may include: writing (ST2) Elements (write.Elements( )) corresponding to the system object (SY), said acquiring including parsing (ST4, SerializeElement( )) said system object (SY) to obtain (ST5 . . . ST8) said fields and corresponding values (InfoData1 . . . InfoDataN) of the information content (IC), encoding (S122) said fields (InfoData1 . . . InfoDataN) into a data serialization format (TLVrootElem(InfoData1) . . . TLVrootElem(InfoData1N), determining a serialized information content (TLV(IC)), in particular by TLV encoding; and storing (ST4) said encoded fields TLVrootObj(InfoData1) . . . TLVrootObj(InfoData1N) and corresponding values in a portion of said reserved area (1084*b*) corresponding (AID1) to the application (APP1) starting from a given offset (Offsx).

Said writing (ST2) Elements (write.Elements( )) corresponding to the system object (SY) may include extracting header fields which in particular describe the type of object, the number of its fields and references (AID, ObjType, numFields, numRefs), encode said header fields (AID, ObjType, numFields, numRefs) and store them at an initial offset value of the portion of said reserved area (1084*b*) corresponding (AID1) to the application (APP1), said given offset (Offs x) starting after said encoded header fields (AID, ObjType, numFields, numRefs).

Reading (S151) said serialized information content (TLV( )IC) from said reserved area of the non-volatile memory (1084) of said secure element (108) may include reading said fields (InfoData1 . . . InfoDataN) into a data serialization format TLVrootObj(InfoData1) . . . TLVrootObj (InfoData1N) in said reserved memory (1084*b*), performing (S152) a decoding from said data serialization format of said serialized information content TLV(IC), obtaining the information content (IC; (InfoData1 . . . InfoDataN)) in the fields of said given system object, then building (S153) said given system objects SY with the obtained fields as fields of said given built system object by introducing (buildElement (objtype, infoData1 . . . infoDataN)) said fields in an Element structure.

Said method may include reading said header fields (AID, ObjType, numFields, numRefs) from the initial offset address (Offs 0) in said portion of reserved memory (1084*b*), performing (S152) said decoding of said header fields (AID, ObjType, numFields, numRefs), initialize said Element structure with said header fields (AID, ObjType, numFields, numRefs).

Saving system objects (SY) to be preserved in said update may include encoding (ST11) in a data serialization format information for transforming a plaintext in a cypher text, in particular at least a cypher key.

Saving system objects (SY) to be preserved in said update may include, in case of a masked sensitive objects, encoding (ST11) in a data serialization format value a sensitive masked value (SensitiveInfoMaskedValue) and an offset address (SensitiveMaskOffs) pointing to a separate mask memory (1084*c*) in said non-volatile memory (1084) where a corresponding mask is stored, and storing said sensitive masked value (SensitiveInfoMaskedValue) and an offset address (SensitiveMaskOffs) in said reserved memory (1084), said reading (S151) said serialized information content from said reserved area of the non-volatile memory (1084) of said secure element (108) including reading said (Sensitive mask offset, masked value) from said reserved area and said mask value from said mask area (1084*c*) to build (buildSensitiveElem(objtype, maskOffs, maskValue) the corresponding sensitive object.

Said preserving said given system object (SY) to said at least one application (APP1) due to said new binary code (NBC) may include performing a restore when the elements corresponding to the objects are ready (RT12) by reading said object in elements (RT14) and constructing a structure of root object, in particular if a sensitive object is present also reading said object in elements (RT17) and constructing (RT18) a root object.

Said encoding and decoding may be a BER-TLV encoding and decoding, in particular a constructed TLV encoding and decoding for the header fields (AID, ObjType, numFields, numRefs).

If the object (O) is a custom object (CO), a standard onSave( ) method of the Amendment H API of GlobalPlatform of the API may be used (S125) for saving and a standard Restore( ) method of the Amendment H API of GlobalPlatform is used to restore (S155).

Said saving system objects (SY) to be preserved in said at least one application (APP1) may include only on system objects to be preserved which are to be updated.

A secure element, in particular integrated circuit card like UICC, eUICC, iUICC, in particular using a Java Card platform, configured to perform a method may include: a memory (1084) configured to store in a reserved area (1084*b*) said encoded data (TLVrootElem(InfoData1) . . . TLVrootElem(InfoData1N); and a one or more processors (102) configured to manage the operations of said method.

Apparatus (10) may include an integrated circuit card (108).

The apparatus may include a mobile communications apparatus (10).

In an embodiment, a method comprises: performing an operative system update operation storing new binary code in a secure element; and preserving custom objects and system objects of an application on the secure element during the operative system update operation. The preserving includes: saving the custom objects and system objects of the application on the secure element; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of a non-volatile memory of the secure element. Recovering the saved system object includes: reading the encoded information content from the reserved area of the non-volatile memory of the secure element; decoding the read encoded information content, obtaining the information content of the fields of the system object; and recovering the system object using the obtained information content of the fields.

In an embodiment, the application is an application of a first Java Card Package or executable load file.

In an embodiment, the operative system update operation modifies an application programming interface function and code associated with the application. In an embodiment, the application is an application of a first Java Card Package or executable load file. In an embodiment, the Java Card Package is compliant with a GlobalPlatform standard and the operative system update relies on an Amendment H API of the GlobalPlatform standard by performing the saving operation using an onSave( )method of Amendment H API and the restoring operation by using a onRestore( ) method of Amendment H API.

In an embodiment, the saving the system object comprises: writing elements corresponding to the system object, parsing the system object to obtain the fields and corresponding values of the information content, encoding the fields into a data serialization format, determining a serialized information content, and storing the encoded fields and corresponding values in a portion of the reserved area corresponding to the application starting from a first offset. In an embodiment, the writing elements corresponding to the system object comprises: extracting header fields which describe a type of the object, a number of fields and references of the object, encoding the header fields and storing the header fields at an initial offset value of the portion of the reserved area corresponding to the application, the first offset starting after the encoded header fields. In an embodiment, recovering the system object includes: reading fields of a data serialization format in the reserved memory; decoding serialized information content, obtaining the information content of the fields of the system object; and recovering the system object with the obtained fields by introducing the obtained fields in an element structure.

In an embodiment, the system object is associated with a cypher key. In an embodiment, saving the system object comprises encoding in a data serialization format value a sensitive masked value and an offset address pointing to a separate mask memory in the non-volatile memory where a corresponding mask is stored, and storing the sensitive masked value and an offset address in the reserved memory, and reading the serialized information content from the reserved area of the non-volatile memory of the secure element comprises reading the sensitive masked value from the reserved area and the mask value from the mask area to build the corresponding system object.

In an embodiment, the preserving the system object comprises performing a restore when elements corresponding to the object are ready by reading the object in elements and constructing a structure of a root object and constructing the root object.

In an embodiment, the encoding and decoding employs a tag-length-value (TLV) encoding scheme. In an embodiment, the TLV encoding scheme is a basic-encoding-rules (BER) encoding scheme.

In an embodiment, saving a custom object comprises performing a standard onSave( ) method of Amendment H API of GlobalPlatform, and restoring the custom object comprises performing a standard Restore( ) method of Amendment H API of GlobalPlatform.

In an embodiment, saving system objects comprises: identifying system objects to be updated; and preserving the identified system objects.

In an embodiment, a secure element comprises a non-volatile memory and processing circuitry coupled to the non-volatile memory. The processing circuitry, in operation, performs an operative system update operation storing new binary code in the non-volatile memory, and preserves custom objects and system objects of an application of the secure element during the operative system update operation. The preserving includes: saving the custom objects and system objects of the application in the non-volatile memory; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of the non-volatile memory; and recovering the saved system object includes: reading the encoded information content from the reserved area of the non-volatile memory; decoding the read encoded information content, obtaining the information content of the fields of the system object; and recovering the system object using the obtained information content of the fields. In an embodiment, the application is an application of a first Java Card Package or executable load file.

In an embodiment, the saving the system object comprises: writing elements corresponding to the system object, parsing the system object to obtain the fields and corresponding values of the information content, encoding the fields into a data serialization format, determining a serialized information content, and storing the encoded fields and corresponding values in a portion of the reserved area corresponding to the application starting from an offset.

In an embodiment, the system object is associated with a cypher key. In an embodiment, saving the system object comprises encoding in a data serialization format value a sensitive masked value and an offset address pointing to a separate mask memory in the non-volatile memory where a corresponding mask is stored, and storing the sensitive masked value and an offset address in the reserved memory, and reading the serialized information content from the reserved area of the non-volatile memory of the secure element comprises reading sensitive masked value from the reserved area and the mask value from the mask area.

In an embodiment, the encoding and decoding employs a tag-length-value (TLV) encoding scheme.

In an embodiment, saving system objects comprises: identifying system objects to be updated; and preserving the identified system objects.

In an embodiment, a system comprises processing circuitry, and a secure circuit having a non-volatile memory. The secure circuit is coupled to processing circuitry, and the secure circuit, in operation, performs an operative system update operation storing new binary code in the non-volatile memory, and preserves custom objects and system objects of an application of the secure element during the operative system update operation. The preserving including: saving the custom objects and system objects of the application in the non-volatile memory; uninstalling the application; creating a new instance of the application; recovering the saved custom objects and the saved system objects; and updating the new instance of the application with the recovered custom objects and system objects. Saving a system object includes: acquiring information content of fields of the system object; encoding the information content into a data serialization format; and storing the encoded information content in a reserved area of the non-volatile memory. Recovering the saved system object includes: reading the encoded information content from the reserved area of the non-volatile memory; decoding the read encoded information content, obtaining the information content of the fields of the system object; and recovering the system object using the obtained information content of the fields. In an embodiment, the application is an application of a first Java Card Package or executable load file.

In an embodiment, the system comprises a mobile communication interface coupled to the secure element.

In an embodiment, a non-transitory computer-readable medium's contents cause a secure element to perform a method, the method comprising: performing an operative system update operation storing new binary code in the secure element; and preserving custom objects and system objects of an application of the secure element during the operative system update operation, the preserving including: saving the custom objects and system objects of the application on the secure element; uninstalling the application; creating a new instance of the application; recovering the saved custom objects and the saved system objects; and updating the new instance of the application with the recovered custom objects and system objects, wherein saving a system object includes: acquiring information content of fields of the system object; encoding the information content into a data serialization format; and storing the encoded information content in a reserved area of a non-volatile memory of the secure element; and recovering the saved system object includes: reading the encoded information content from the reserved area of the non-volatile memory of the secure element; decoding the read encoded information content, obtaining the information content of the fields of the system object; and recovering the system object using the obtained information content of the fields. In an embodiment, the contents comprise instructions executable by the secure element.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

performing an operative system update operation storing new binary code in a secure element; and preserving custom objects and system objects of an application on the secure element during the operative system update operation, the preserving including:

saving the custom objects and system objects of the application on the secure element;
uninstalling the application;
creating a new instance of the application;
recovering the saved custom objects and the saved system objects; and
updating the new instance of the application with the recovered custom objects and system objects, wherein
saving a system object includes:
acquiring information content of fields of the system object;
encoding the information content into a data serialization format; and
storing the encoded information content in a reserved area of a non-volatile memory of the secure element; and
recovering the saved system object includes:
reading the encoded information content from the reserved area of the non-volatile memory of the secure element;
decoding the read encoded information content, obtaining the information content of the fields of the system object; and
recovering the system object using the obtained information content of the fields.

2. The method according to claim 1, wherein the application is an application of a first Java Card Package or executable load file.

3. The method of claim 1, wherein the operative system update operation modifies an application programming interface function and code associated with the application.

4. The method according to claim 3, wherein the application is an application of a first Java Card Package or executable load file.

5. The method according to claim 4, wherein the Java Card Package is compliant with a GlobalPlatform standard and the operative system update relies on an Amendment H API of the GlobalPlatform standard by performing the saving operation using an onSave( ) method of Amendment H API and the restoring operation by using a onRestore( ) method of Amendment H API.

6. The method of claim 1, wherein the saving the system object comprises:
writing elements corresponding to the system object,
parsing the system object to obtain the fields and corresponding values of the information content,
encoding the fields into a data serialization format, determining a serialized information content, and
storing the encoded fields and corresponding values in a portion of the reserved area corresponding to the application starting from a first offset.

7. The method of claim 6, wherein the writing elements corresponding to the system object comprises:
extracting header fields which describe a type of the object, a number of fields and references of the object,
encoding the header fields and storing the header fields at an initial offset value of the portion of the reserved area corresponding to the application, the first offset starting after the encoded header fields.

8. The method of claim 7, wherein recovering the system object includes:
reading fields of a data serialization format in the reserved memory;
decoding serialized information content, obtaining the information content of the fields of the system object; and
recovering the system object with the obtained fields by introducing the obtained fields in an element structure.

9. The method of claim 1, wherein the system object is associated with a cypher key.

10. The method of claim 9, wherein
saving the system object comprises encoding in a data serialization format value a sensitive masked value and an offset address pointing to a separate mask memory in the non-volatile memory where a corresponding mask is stored, and storing the sensitive masked value and an offset address in the reserved memory, and
reading the serialized information content from the reserved area of the non-volatile memory of the secure element comprises reading the sensitive masked value from the reserved area and the mask value from the mask area to build the corresponding system object.

11. The method of claim 1, wherein the preserving the system object comprises performing a restore when elements corresponding to the object are ready by reading the object in elements and constructing a structure of a root object and constructing the root object.

12. The method of claim 1, wherein the encoding and decoding employs a tag-length-value (TLV) encoding scheme.

13. The method of claim 12, wherein the TLV encoding scheme is a basic-encoding-rules (BER) encoding scheme.

14. The method of claim 5, wherein,
saving a custom object comprises performing a standard onSave( ) method of Amendment H API of GlobalPlatform, and
restoring the custom object comprises performing a standard Restore( ) method of Amendment H API of GlobalPlatform.

15. The method of claim 1, wherein the saving system objects comprises:
identifying system objects to be updated; and
preserving the identified system objects.

16. A secure element, comprising:
a non-volatile memory; and
processing circuitry coupled to the non-volatile memory, wherein the processing circuitry, in operation,
performs an operative system update operation storing new binary code in the non-volatile memory; and
preserves custom objects and system objects of an application of the secure element during the operative system update operation, the preserving including:
saving the custom objects and system objects of the application in the non-volatile memory;
uninstalling the application;
creating a new instance of the application;
recovering the saved custom objects and the saved system objects; and
updating the new instance of the application with the recovered custom objects and system objects, wherein
saving a system object includes:
acquiring information content of fields of the system object;
encoding the information content into a data serialization format; and
storing the encoded information content in a reserved area of the non-volatile memory; and
recovering the saved system object includes:
reading the encoded information content from the reserved area of the non-volatile memory;

decoding the read encoded information content, obtaining the information content of the fields of the system object; and recovering the system object using the obtained information content of the fields.

17. The secure element according to claim 16, wherein the application is an application of a first Java Card Package or executable load file.

18. The secure element of claim 16, wherein the saving the system object comprises:

writing elements corresponding to the system object, parsing the system object to obtain the fields and corresponding values of the information content, encoding the fields into a data serialization format, determining a serialized information content, and storing the encoded fields and corresponding values in a portion of the reserved area corresponding to the application starting from an offset.

19. The secure element of claim 16, wherein the system object is associated with a cypher key.

20. The secure element of claim 19, wherein saving the system object comprises encoding in a data serialization format value a sensitive masked value and an offset address pointing to a separate mask memory in the non-volatile memory where a corresponding mask is stored, and storing the sensitive masked value and an offset address in the reserved memory, and reading the serialized information content from the reserved area of the non-volatile memory of the secure element comprises reading sensitive masked value from the reserved area and the mask value from the mask area.

21. The secure element of claim 16, wherein the encoding and decoding employs a tag-length-value (TLV) encoding scheme.

22. The secure element of claim 16, wherein the saving system objects comprises:

identifying system objects to be updated; and preserving the identified system objects.

23. A system comprising:

processing circuitry; and a secure circuit having a non-volatile memory, wherein the secure circuit is coupled to processing circuitry, and the secure circuit, in operation, performs an operative system update operation storing new binary code in the non-volatile memory; and preserves custom objects and system objects of an application of the secure element during the operative system update operation, the preserving including:

saving the custom objects and system objects of the application in the non-volatile memory;

uninstalling the application;

creating a new instance of the application;

recovering the saved custom objects and the saved system objects; and updating the new instance of the application with the recovered custom objects and system objects, wherein saving a system object includes:

acquiring information content of fields of the system object;

encoding the information content into a data serialization format; and storing the encoded information content in a reserved area of the non-volatile memory; and recovering the saved system object includes:

reading the encoded information content from the reserved area of the non-volatile memory;

decoding the read encoded information content, obtaining the information content of the fields of the system object; and recovering the system object using the obtained information content of the fields.

24. The system according to claim 23, wherein the application is an application of a first Java Card Package or executable load file.

25. The system of claim 23, comprising a mobile communication interface coupled to the secure element.

26. A non-transitory computer-readable medium having contents which cause a secure element to perform a method, the method comprising:

performing an operative system update operation storing new binary code in the secure element; and preserving custom objects and system objects of an application of the secure element during the operative system update operation, the preserving including:

saving the custom objects and system objects of the application on the secure element;

uninstalling the application;

creating a new instance of the application;

recovering the saved custom objects and the saved system objects; and updating the new instance of the application with the recovered custom objects and system objects, wherein saving a system object includes:

acquiring information content of fields of the system object;

encoding the information content into a data serialization format; and storing the encoded information content in a reserved area of a non-volatile memory of the secure element; and recovering the saved system object includes:

reading the encoded information content from the reserved area of the non-volatile memory of the secure element;

decoding the read encoded information content, obtaining the information content of the fields of the system object; and recovering the system object using the obtained information content of the fields.

27. The non-transitory computer-readable medium according to claim 26, wherein the contents comprise instructions executable by the secure element.

* * * * *